United States Patent
Li et al.

(10) Patent No.: US 10,739,900 B2
(45) Date of Patent: Aug. 11, 2020

(54) TOUCH DISPLAY PANEL HAVING FINGERPRINT RECOGNITION DEVICE INTEGRATED THEREWITH AND TOUCH DISPLAY DEVICE INCLUDING SAME

(71) Applicant: Wuhan China Star Optoelectronics Technology Co., Ltd., Wuhan, Hubei (CN)

(72) Inventors: Man Li, Guangdong (CN); Qingcheng Zuo, Guangdong (CN); Xiaoling Yuan, Guangdong (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 183 days.

(21) Appl. No.: 15/562,313

(22) PCT Filed: Jul. 26, 2017

(86) PCT No.: PCT/CN2017/094411
§ 371 (c)(1),
(2) Date: Sep. 27, 2017

(87) PCT Pub. No.: WO2019/000531
PCT Pub. Date: Jan. 3, 2019

(65) Prior Publication Data
US 2019/0004663 A1    Jan. 3, 2019

(30) Foreign Application Priority Data
Jun. 29, 2017 (CN) .......................... 2017 1 0518067

(51) Int. Cl.
*G06F 3/041* (2006.01)
*G06K 9/00* (2006.01)
*G06F 3/044* (2006.01)

(52) U.S. Cl.
CPC ............ *G06F 3/0416* (2013.01); *G06F 3/044* (2013.01); *G06F 3/0412* (2013.01); *G06K 9/0002* (2013.01)

(58) Field of Classification Search
CPC ...... G06F 3/0416; G06F 3/0412; G06F 3/044; G06K 9/0002
(Continued)

(56) References Cited

U.S. PATENT DOCUMENTS

| | | | |
|---|---|---|---|
| 2015/0062059 A1* | 3/2015 | Ho .................. | G06F 1/3262 345/174 |
| 2015/0177884 A1* | 6/2015 | Han ................. | G06F 3/044 345/174 |

(Continued)

FOREIGN PATENT DOCUMENTS

| | | |
|---|---|---|
| CN | 104699320 A | 6/2015 |
| CN | 105159506 A | 12/2015 |

(Continued)

*Primary Examiner* — Jonathan M Blancha
(74) *Attorney, Agent, or Firm* — Leong C. Lei

(57) ABSTRACT

A touch display panel includes touch detection electrodes and fingerprint recognition electrodes that share a common electrode layer. The pixel electrodes function as a drive pixel layer to induce capacitive coupling with respect to the fingerprint recognition electrodes, based on which operations of displaying, touch detection, and fingerprint recognition are carried out in a time sharing manner. The touch display panel requires no integration of separately made fingerprint recognition device and a touch display panel, and fingerprint detection can be realized with an existing layered structure of the touch display panel to thereby effectively save the manufacturing cost of the touch display device and achieve an effect of integrating a fingerprint recognition device and a touch display panel. A touch display device that includes the touch display panel is also provided.

12 Claims, 3 Drawing Sheets

(58) Field of Classification Search
USPC .......................................................... 345/173
See application file for complete search history.

(56) References Cited

U.S. PATENT DOCUMENTS

| | | | |
|---|---|---|---|
| 2016/0041642 A1* | 2/2016 | Cheng | G06F 3/044 345/174 |
| 2016/0092717 A1* | 3/2016 | Ling | G06K 9/0004 382/125 |
| 2016/0098140 A1* | 4/2016 | Lee | G06F 3/0416 345/173 |
| 2016/0132713 A1* | 5/2016 | Bae | G06F 3/0412 345/174 |
| 2016/0292487 A1* | 10/2016 | Sun | G06K 9/0002 |
| 2016/0350571 A1* | 12/2016 | Han | G06K 9/0002 |
| 2017/0090624 A1* | 3/2017 | Kwon | G06F 3/0416 |
| 2017/0123555 A1* | 5/2017 | Kim | G06F 3/0412 |
| 2018/0101259 A1* | 4/2018 | No | G06K 9/00006 |

FOREIGN PATENT DOCUMENTS

| | | |
|---|---|---|
| CN | 106249973 A | 12/2016 |
| CN | 106775129 A | 5/2017 |
| CN | 106803076 A | 6/2017 |
| KR | 20120138886 A | 12/2012 |

* cited by examiner

TOUCH DISPLAY PANEL HAVING FINGERPRINT RECOGNITION DEVICE INTEGRATED THEREWITH AND TOUCH DISPLAY DEVICE INCLUDING SAME

CROSS REFERENCE TO RELATED APPLICATIONS

This application claims the priority of Chinese Patent Application No. 201710518067.8 filed on Jun. 29, 2017, titled "Touch Display Panel and Touch Display Device", the disclosure of which is incorporated herein by reference in its entirety.

BACKGROUND OF THE INVENTION

1. Field of the Invention

The present invention relates to the field of liquid crystal display technology, and more particularly to a touch display panel and a touch display device.

2. The Related Arts

A touch display panel is used in a display device to allow a user to view an image and at the same time conduct an operation associated therewith. The touch display panels are one of the important carriers that combine input and output terminals together as a unitary device. By detecting a coordinate position of the site of a touch made on the touch display panel, the user's intention can be readily recognized according to the content (such as an interface icon) displayed on the touch display panel at the corresponding to the coordinate position and the associated operation can be carried out. With the progress of information security technology, the user, when attempting to conduct certain operations (such as operation concerning transferring money transfers and making payments) on the touch display panel, must pass fingerprint inspection for security confirmation in order to improve information security. Consequently, the demand for touch display panels with fingerprint recognition is increasingly expanded.

A conventional fingerprint recognition device often involves a circuit structure that is based on silicon substrates and fingerprint recognition units respectively corresponding to positions of a two-dimensional dot matrix for inspecting positions corresponding to ridges/valleys of an impression of a fingerprint in order to form certain information containing an impression structure of alternating ridges and valleys of a predetermined pattern for identification of fingerprint. However, such a process is based on backing formed of silicon substrates and adaptation of technology and parameters involving in the manufacturing of chips so that, on the one hand, the manufacturing costs are high and, on the other hand, the silicon substrate is not of a light-transmitting material and, when set in a display zone of a touch display panel, would affect normal displaying of images and is thus disadvantageous for integration of the fingerprint recognition device and the touch display panel together, and when set in a peripheral frame zone of the touch display panel, would undesirably expand the area of the non-display zone of the touch display panel.

SUMMARY OF THE INVENTION

Embodiments of the present invention provide a touch display panel and a touch display device, which require no integration of a separately-made fingerprint recognition device and a touch display panel, may effectively save the manufacturing cost of the touch display device, and achieve an effect of integrating a fingerprint recognition device and a touch display panel.

In a first aspect, embodiments of the present invention provide a touch display panel, which comprises a touch detection zone and a fingerprint recognition zone. The fingerprint recognition zone is located in the touch detection zone. The touch detection zone comprises a plurality of touch detection units arranged in an array. The touch detection units are connected, through first signal transmission lines respectively connected therewith, to a driver integrated circuit. The fingerprint recognition zone comprises a plurality of fingerprint recognition units arranged in an array. The fingerprint recognition units are connected, through second signal transmission lines respectively connected therewith, to the driver integrated circuit. The driver integrated circuit is operable to drive, in a time sharing manner, the touch detection units and the fingerprint recognition units to carry out, in a time sharing manner, operations of displaying, touch detection, and fingerprint recognition.

In the above touch display panel, the touch display panel comprises a pixel structure layer and a common electrode layer insulated from each other; the pixel structure layer comprises a plurality of pixel units arranged in an array; and the touch detection units and the fingerprint recognition units share the common electrode layer.

Optionally, each of the fingerprint recognition units is arranged at a location corresponding to each of the pixel units.

Optionally, each of the fingerprint recognition units is arranged at a location corresponding to multiple ones of the pixel units; or, multiple ones of the pixel units are grouped to correspond to one of the fingerprint recognition units.

In the above touch display panel, the pixel structure layer and the common electrode layer are operated in cooperation with each other to achieve, in a time sharing manner, the operations of displaying, touch detection, and fingerprint recognition.

In the above touch display panel, in the operation of fingerprint recognition, the pixel electrodes arranged in the pixel units function as a drive pixel layer, which induces capacitive coupling with respect to the fingerprint recognition electrodes arranged in the fingerprint recognition units, the driver integrated circuit acquiring information of fingerprint feature by detecting information of capacitance variation of the fingerprint recognition units.

Optionally, each of the touch detection units is corresponding to and connected with each of the first signal transmission lines, and each of the fingerprint recognition units is corresponding to and connected with each of the second signal transmission lines.

In the above touch display panel, when the driver integrated circuit drives the touch detection units, the driver integrated circuit drives the touch detection units to transmit a common voltage signal and a touch detection signal in a time sharing manner.

Optionally, among the fingerprint recognition units that are located in the fingerprint recognition zone and arranged in an array, the fingerprint recognition units that are set in one common column are connected to each other and a last one of the fingerprint recognition units of the column is connected, through the second signal transmission line, to the driver integrated circuit.

In a second aspect, embodiments of the present invention provide a touch display device, which comprises the touch display panel of the first aspect.

In the embodiments of the present invention, the touch detection electrodes and the fingerprint recognition electrodes share the common electrode layer, and the pixel electrodes function as a drive pixel layer to induce capacitive coupling with respect to the fingerprint recognition electrodes, based on which operations of displaying, touch detection, and fingerprint recognition can be carried out in a time sharing manner. Thus, the touch display panel and the touch display device of the present invention require no integration of a separately-made fingerprint recognition device and a touch display panel, and fingerprint detection can be realized with an existing layered structure of the touch display panel to thereby effectively save the manufacturing cost of the touch display device and achieve an effect of integrating a fingerprint recognition device and a touch display panel.

BRIEF DESCRIPTION OF THE DRAWINGS

To more clearly explain the technical solution proposed in an embodiment of the present invention and that of the prior art, a brief description of the drawings that are necessary for describing the embodiment or the prior art is given as follows. It is obvious that the drawings that will be described below show only some embodiments of this application. For those having ordinary skills of the art, other obvious variations may be readily available from these attached drawings without the expense of creative effort and endeavor.

DETAILED DESCRIPTION OF THE PREFERRED EMBODIMENTS

Figure 1:
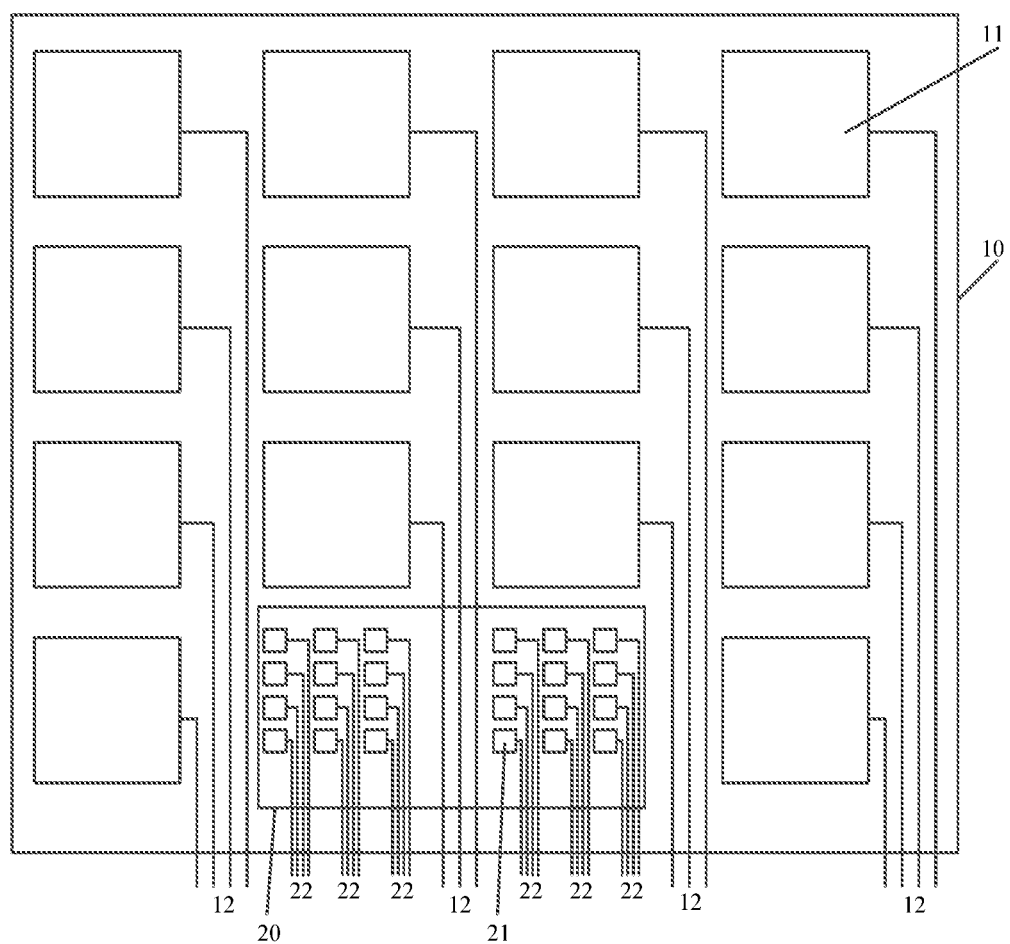
FIG. 1 is a schematic view illustrating a structure of a touch display panel according to an embodiment of the present invention.

A clear and complete description will be given to technical solutions provided by embodiments of the present invention with reference to the attached drawings of the embodiments of the present invention. However, the embodiments so described are only some, but not all, of the embodiments of the present invention. Other embodiments that are available to those having ordinary skills of the art without the expense of creative effort and endeavor are considered belonging to the scope of protection of the present invention.

In addition, the description given below for each embodiment is made with reference to the attached drawings to exemplify specific embodiments that the present invention may be put into practice. Direction related terminology used in the present invention, such as "up", "down", "front", "rear", "left", "right", "internal", "external", and "lateral", is provided as direction defined in the drawing sheets. Thus, using the direction related terminology, which is for better and more clearly describing and understanding of the present invention and is not for indicating or implying any specific orientation that a device or an element described must take or the device or element must be structured or operated at a specific orientation, should thus be appreciated as not imposing constraints to the present invention.

In the description of the present invention, it should be noted that unless specifically required and set, the terms "installation", "connection", and "jointing" as used herein should be interpreted in a broad way, such as being fixedly connected or removably connected, or integrally connected; or being mechanically connected; or being directly connected, or indirectly connected with intervening media therebetween, or interiors of two element being in communication with each other. For those having ordinary skills in the art, the specific meaning of these terms used in the present invention can be appreciated for any actual situations.

Further, in the description of the present invention, unless stated otherwise, "multiple" means two or more than two. Terms related to "operations", if used in this specification, should means independent operations and for cases where distinction from other operations, any operation that achieve a desired effect of the operation is included in the terms so used. Further, the symbol "-" as used in this specification stands for a numeral range, which comprises a range of which the minimum and the maximum are respectively the figures set in front of and behind "-". In the drawings, units having similar or the same structure are designated with the same reference numerals.

Embodiments of the present invention provide a touch display panel and a touch display device, which require no integration of a separately-made fingerprint recognition device and a touch display panel, may effectively save the manufacturing cost of the touch display device, and achieve an effect of integrating a fingerprint recognition device and a touch display panel. Detailed descriptions will be provided below.

Referring to FIG. 1, FIG. 1 is a schematic view illustrating a structure of a touch display panel according to an embodiment of the present invention. As shown in FIG. 1, the touch display panel comprises a touch detection zone 10 and a fingerprint recognition zone 20, wherein the fingerprint recognition zone 20 is located in the touch detection zone 10. Specifically, the fingerprint recognition zone 20 is arranged in the touch detection zone 10 of the touch display panel at a location that allows a user to conduct certain operations (such as operations concerning transferring money and making payments) on the touch display panel (for example being located at a bottom of the touch display panel or a location close to the bottom to allow the user to carry out a fingerprint recognition operation while holding a touch display device that comprises the touch display panel), to help the user to pass fingerprint recognition for security confirmation. Further, the touch detection zone 10 is divided into a plurality of independent touch detection units 11 that re arranged in an array, in which each of the touch detection units 11 is corresponding to and is connected with a first signal transmission line 12. Further, the fingerprint recognition zone 20 is divided into a plurality of independent fingerprint recognition units 21 that are arranged in an array, in which each of the fingerprint recognition units 21 is corresponding to and connected with a second signal transmission line 22.

In an embodiment of the present invention, each of the touch detection units 11 comprises a touch detection electrode arranged therein and each of the fingerprint recognition units comprises a fingerprint recognition electrode arranged therein.

In an embodiment of the present invention, the touch display panel comprises a pixel structure layer and a common electrode layer that are arranged as different layers and are insulated from each other. The pixel structure layer is divided into a plurality of independent pixel units that are arranged in an array and each of the pixel units comprises a pixel electrode arranged therein. The touch detection units 11 and the fingerprint recognition units 21 share a common electrode layer, namely the touch detection electrodes and the fingerprint recognition electrodes collectively use the common electrode layer.

Optionally, the fingerprint recognition units 21 have a surface area that is smaller than a surface area of the touch detection units 11. In an embodiment, the surface of area the touch detection units 11 is arranged as 5 mm×5 mm, and the touch detection units 11 may use the touch detection electrodes arranged therein, by way of the first signal transmission lines 12 connected therewith, to connect to a driver integrated circuit (not shown); and the surface area of the fingerprint recognition units 21 is arranged as 50 μm×50 μm, and the fingerprint recognition units 21 may use the fingerprint recognition electrodes arranged therein, by way of the second signal transmission lines 22 connected therewith, to connect to the driver integrated circuit.

Figure 2:
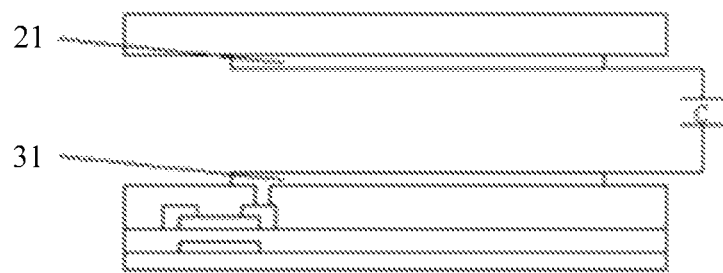
FIG. 2 is a schematic view illustrating a spatial relationship of corresponding between a pixel unit and a fingerprinting recognition unit according to the embodiment of the present invention.

In an embodiment of the present invention, the pixel units of the pixel structure layer are arranged in a corresponding relationship, in respect of location and number, with respect to the fingerprint recognition units 21. In an embodiment of the present invention, as shown in FIG. 2, the corresponding relationship between the pixel units and the fingerprint recognition units 21 is specifically that each of the fingerprint recognition units 21 is arranged at a location corresponding to each of the pixel units 31.

Figure 3:
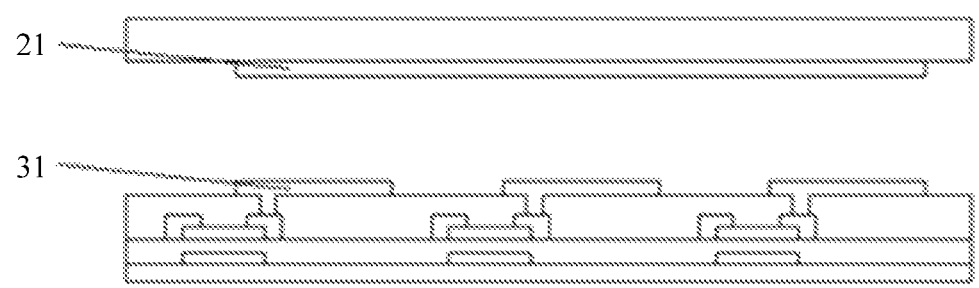
FIG. 3 is a schematic view illustrating another spatial relationship of corresponding between a pixel unit and a fingerprinting recognition unit according to the embodiment of the present invention.

In another embodiment of the present invention, as shown in FIG. 3, alternatively, the corresponding relationship between the pixel units and the fingerprint recognition units 21 is specifically that each of the fingerprint recognition units 21 is arranged at a location corresponding to multiple ones of the pixel units 31, or, multiple ones of the pixel units 31 are combined to correspond to one of the fingerprint recognition units 21.

In a specific embodiment, the driver integrated circuit drives, in a time sharing manner, the touch detection units 11 and the fingerprint recognition units 21. And, the operation that the driver integrated circuit drives the touch detection units 11 may specifically comprise: the driver integrated circuit drives the touch detection units 11 to transmit, in a time-sharing manner, a common voltage signal and a touch detection signal. As such, the pixel structure layer and the common electrode layer operated in a cooperative manner at different time period can be achieved to respectively carry out functions of image displaying, touch detecting, and fingerprint recognizing.

Specifically, in the touch detecting period, when the touch display panel receives, on the touch detection zone 10, a touch operation of a user, capacitance of the touch detection unit 11 at the location of the touch operation of the user becomes varying and the touch detection unit 11 acquires information of capacitance variation (such as the amount of variation of capacitance) that is transmitted through the first signal transmission line 12 connected therewith to the driver integrated circuit, so that the driver integrated circuit conducts processing of the information of capacitance variation received to acquire information concerning location and trace of the touch thereby achieving detection of touch.

Specifically, in the fingerprinting recognizing period, the pixel electrodes arranged in the pixel units 31 are used as a drive pixel layer for capacitive coupling with the fingerprint recognition electrodes arranged in the fingerprint recognition units 21 so as to induce a capacitor in the area where the fingerprint recognition units 21 are located. When external environment does not change, meaning the touch display panel does not receive a touch operation of the user in the fingerprint recognition zone 20, the capacitance does not change; and when the touch display panel receives a touch operation of the user in the fingerprint recognition zone 20 (such as a touch operation with a finger pulp), the capacitance varies, and due to different portions of the fingerprint impression (such as ridges and valleys) being spaced from the fingerprint recognition electrode by different distances, the different portions of the fingerprint impression may induce different variations of the capacitance with respect to the touch detection units 21 so that the touch detection units 21 would acquire information of the capacitance variation (such as the amount of variation of capacitance) that is transmitted through the second signal transmission line 22 connected therewith to the driver integrated circuit, so that the driver integrated circuit conducts processing of the information of capacitance variation received to acquire information concerning a feature of the fingerprint thereby achieving recognition of fingerprint. The information concerning the feature of the fingerprint can be information containing a fingerprint structure of alternating ridges and valleys of a predetermined style.

In the case where each of the fingerprint recognition units 21 is corresponding to and connected with one second signal transmission line 22, the number of the second signal transmission lines arranged in the common electrode layers is large. Thus, in another embodiment of the present invention, for the purpose of reducing the number of the second signal transmission lines 22 for the fingerprint recognition units 21 located in different rows, the fingerprint recognition units 21 of the same column may be sequentially connected to each other and one of these fingerprint recognition units 21 is connected, by way of a second signal transmission line 22 connected therewith, to the driver integrated circuit. In the fingerprint recognizing period, the driver integrated circuit is operating, in cooperation with the pixel electrodes arranged in the pixel units 31, to scan, in a row by row manner, the fingerprint recognition electrodes arranged in the fingerprint recognition units 21 of each row connected to the driver integrated circuit to thereby achieve fingerprint recognition.

Figure 4:
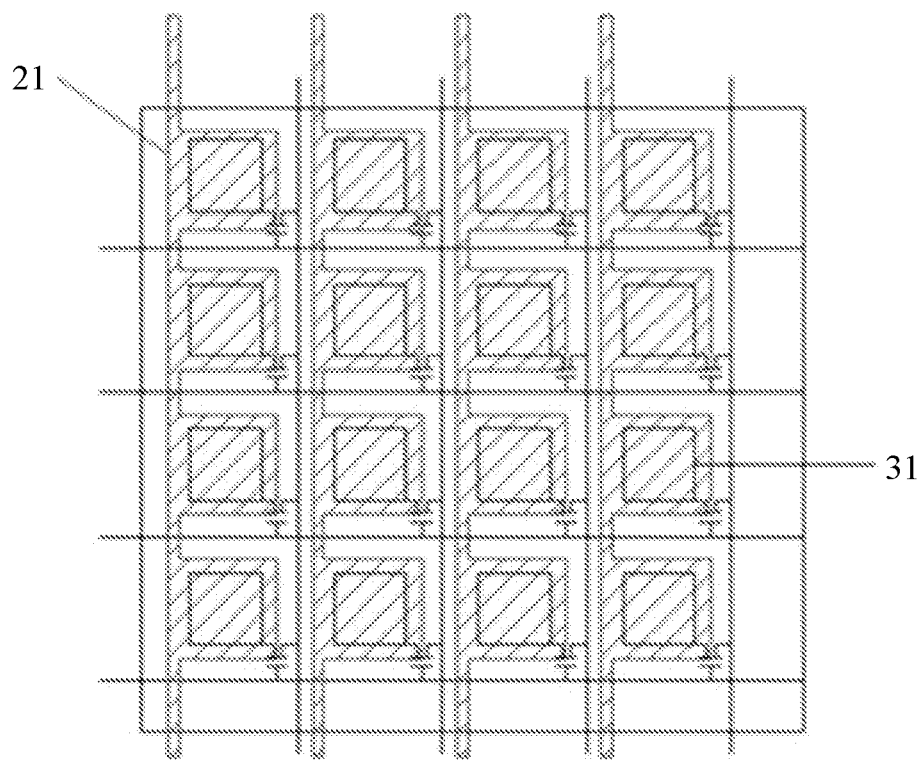
FIG. 4 is a schematic view illustrating a structure of a fingerprint recognition electrode according to an embodiment of the present invention.

The embodiments of the present invention impose no limitation to the connection among the fingerprint recognition units 21 that are located in the same column of the fingerprint recognition units 21 that are located in the fingerprint recognition zone 20 and are arranged in an array. For example, a conductive layer may be added on the basis of the common electrode layer so that the conductive layer may be formed with a wiring line connected to the fingerprint recognition units 21 of the same column. As an other example, a circuit arrangement as that shown in FIG. 4 may be formed on the common electrode layer such that the fingerprint recognition units 21 of the same column may be connected to each other and the last one of the fingerprint recognition units 21 of the column is connected, through the second signal transmission line 22 connected therewith, to the driver integrated circuit.

Embodiments of the present invention also provide a touch display device, and the touch display device comprises the touch display panel as shown in FIGS. 1-4. For example, the touch display device may comprise, but not limited thereto, a mobile phone (such as Android mobile phones and iOS mobile phones), a tablet computer, a mobile internet device (MID), a personal distal assistant (PDA), a notebook computer, a television, an electronic paper, and a digital picture frame that comprises the touch display panel shown in FIGS. 1-4.

In the touch display panel and touch display device provided in the present invention, the touch detection electrodes and the fingerprint recognition electrodes share the common electrode layer, and the pixel electrodes function as a drive pixel layer to induce capacitive coupling with respect to the fingerprint recognition electrodes, based on which operations of displaying, touch detection, and fingerprint recognition can be carried out in a time sharing manner. Thus, the touch display panel and the touch display device of the present invention require no integration of a separately-made fingerprint recognition device and a touch display panel, and fingerprint detection can be realized with an existing layered structure of the touch display panel to thereby effectively save the manufacturing cost of the touch display device and achieve an effect of integrating a fingerprint recognition device and a touch display panel.

In the description of the disclosure, the terms "an embodiment", "some embodiments", "an illustrative example", "a specific example", and "some examples" as used herein refer to specific features, structures, materials, or characteristics involved in the embodiment(s) or example(s) are included in at least one embodiment or example of the present invention. In the disclosure, expressions referring to the above mentioned terms may not be referring to the same embodiment or example. Further, the description of the specific features, structures, materials, or characteristics can be combined, through proper arrangements, in any specific one or multiple ones of embodiments or examples.

The above provides a detailed description of a touch display panel and a touch display device according to embodiments of the present invention. Specific examples are used in the specification to expound the principle and ways of embodiment of the present invention. The above description of the embodiments is provided to help understanding of the method of the present invention, as well as the essential idea thereof. Further, for those having ordinary skills in the art, it is contemplated to make modifications, based on the idea of the present invention, on the embodiments and applications thereof. In conclusion, the contents of specification should not be construed as constraint to the scope of the present invention.

What is claimed is:

1. A touch display panel, comprising a touch detection zone and a fingerprint recognition zone, the fingerprint recognition zone being located in the touch detection zone, the touch detection zone comprising a plurality of touch detection units in the form of first rectangular blocks arranged in an array, the touch detection units being connected, through first signal transmission lines respectively connected therewith, to a driver integrated circuit, the fingerprint recognition zone comprising a plurality of fingerprint recognition units in the form of second rectangular blocks arranged in an array, the fingerprint recognition units being connected, through second signal transmission lines respectively connected therewith, to the driver integrated circuit, the driver integrated circuit being operable to drive, in a time sharing manner, the touch detection units and the fingerprint recognition units to carry out, in a time sharing manner, operations of displaying, touch detection, and fingerprint recognition;

wherein the touch display panel comprises a pixel structure layer and a common electrode layer insulated from each other; the pixel structure layer comprises a plurality of pixel units arranged in an array, each of the plurality of pixel electrode units having a surface; and the touch detection units and the fingerprint recognition units share the common electrode layer, wherein the plurality of fingerprint recognition units are arranged to correspond to at least multiple pixel units of the plurality of pixel units, such that each of the plurality of fingerprint recognition units corresponds to a single pixel unit of the at least multiple pixel units and each of the plurality of fingerprint recognition units comprises a fingerprint recognition electrode that has a surface facing the surface of the single pixel unit of the at least multiple pixel units, the surface of the fingerprint recognition electrode being larger than and completely covering the surface of the single pixel unit of the at least multiple pixel units so as to induce capacitance coupling between the surface of the pixel unit and the surface of the fingerprint recognition electrode of the fingerprint recognition unit.

2. The touch display panel as claimed in claim 1, wherein the pixel structure layer and the common electrode layer are operated in cooperation with each other to achieve, in a time sharing manner, the operations of displaying, touch detection, and fingerprint recognition.

3. The touch display panel as claimed in claim 2, wherein in the operation of fingerprint recognition, the pixel electrodes arranged in the pixel units function as a drive pixel layer, which induces capacitive coupling with respect to the fingerprint recognition electrodes arranged in the fingerprint recognition units, the driver integrated circuit acquiring information of fingerprint feature by detecting information of capacitance variation of the fingerprint recognition units.

4. The ouch display panel as claimed in claim 1, wherein each of the touch detection units is corresponding to and connected with each of the first signal transmission lines, and each of the fingerprint recognition units is corresponding to and connected with each of the second signal transmission lines.

5. The touch display panel as claimed in claim 1, wherein when the driver integrated circuit drives the touch detection units, the driver integrated circuit drives the touch detection units to transmit a common voltage signal and a touch detection signal in a time sharing manner.

6. The touch display panel as claimed in claim 1, wherein among the fingerprint recognition units that are located in the fingerprint recognition zone and arranged in an array, the fingerprint recognition units that are set in one common column are connected to each other and a last one of the fingerprint recognition units of the column is connected, through the second signal transmission line, to the driver integrated circuit.

7. A touch display device, comprising a touch display panel, wherein the touch display panel comprises a touch detection zone and a fingerprint recognition zone, the fingerprint recognition zone being located in the touch detection zone; the touch detection zone comprises a plurality of touch detection units in the form of first rectangular blocks arranged in an array, the touch detection units being connected through first signal transmission lines respectively connected therewith, to a driver integrated circuit; the fingerprint recognition zone comprises a plurality of fingerprint recognition units in the form of first rectangular blocks arranged in an array, the fingerprint recognition units being connected, through second signal transmission lines respectively connected therewith, to the driver integrated circuit; and the driver integrated circuit is operable to drive, in a time sharing manner, the touch detection units and the fingerprint recognition units to carry out, in a time sharing manner, operations of displaying, touch detection, and fingerprint recognition;

wherein the touch display panel comprises a pixel structure layer and a common electrode layer insulated from each other; the pixel structure layer comprises a plurality of pixel units arranged in an array, each of the plurality of pixel electrode units having a surface; and the touch detection units and the fingerprint recognition units share the common electrode layer, wherein the plurality of fingerprint recognition units are arranged to correspond to at least multiple pixel units of the plurality of pixel units, such that each of the plurality of fingerprint recognition units corresponds to a single pixel unit of the at least multiple pixel units and each of the plurality of fingerprint recognition units comprises a fingerprint recognition electrode that has a surface facing the surface of the single pixel unit of the at least multiple pixel units, the surface of the fingerprint recognition electrode being larger than and completely covering the surface of the single pixel unit of the at least multiple pixel units so as to induce capacitance coupling between the surface of the pixel unit and the surface of the fingerprint recognition electrode of the fingerprint recognition unit.

8. The touch display device as claimed in claim 7, wherein the pixel structure layer and the common electrode layer are operated in cooperation with each other to achieve, in a time sharing manner, the operations of displaying, touch detection, and fingerprint recognition.

9. The touch display device as claimed in claim 8, wherein in the operation of fingerprint recognition, the pixel electrodes arranged in the pixel units function as a drive pixel layer, which induces capacitive coupling with respect to the fingerprint recognition electrodes arranged in the fingerprint recognition units, the driver integrated circuit acquiring information of fingerprint feature by detecting information of capacitance variation of the fingerprint recognition units.

10. The touch display device as claimed in claim 7, wherein each of the touch detection units is corresponding to and connected with each of the first signal transmission lines, and each of the fingerprint recognition units is corresponding to and connected with each of the second signal transmission lines.

11. The touch display device as claimed in claim 7, wherein when the driver integrated circuit drives the touch detection units, the driver integrated circuit drives the touch detection units to transmit a common voltage signal and a touch detection signal in a time sharing manner.

12. The touch display device as claimed in claim 7, wherein among the fingerprint recognition units that are located in the fingerprint recognition zone and arranged in an array, the fingerprint recognition units that are set in one common column are connected to each other and a last one of the fingerprint recognition units of the column is connected, through the second signal transmission line, to the driver integrated circuit.

* * * * *